F. MARTIN.
WIRE BRUSH.
APPLICATION FILED JAN. 20, 1908.
998,022.  Patented July 18, 1911.
Fig. 1.
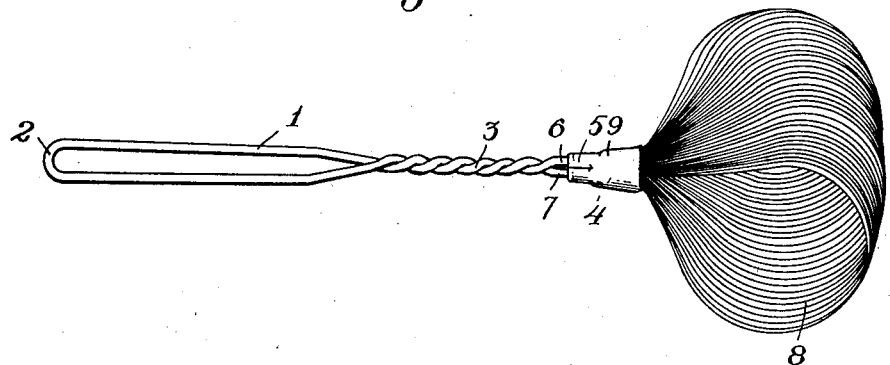
Fig. 2.
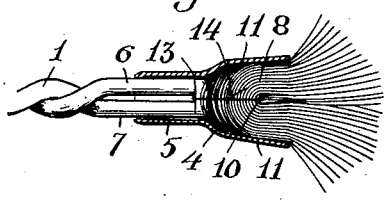
Fig. 3.
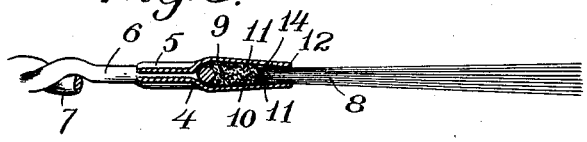
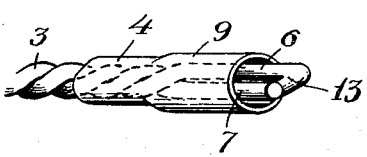
Fig. 4.
Witnesses
R. B. Tolman.
Penelope Cumberbatch.
Inventor
Frank Martin.
By Rufus B. Fowler
Attorney

UNITED STATES PATENT OFFICE.

FRANK MARTIN, OF WORCESTER, MASSACHUSETTS, ASSIGNOR TO WRIGHT WIRE COMPANY, OF WORCESTER, MASSACHUSETTS, A CORPORATION OF MASSACHUSETTS.

WIRE BRUSH.

998,022.   Specification of Letters Patent.   Patented July 18, 1911.

Application filed January 20, 1908. Serial No. 411,643.

*To all whom it may concern:*

Be it known that I, FRANK MARTIN, a citizen of the United States, residing at Worcester, in the county of Worcester and Commonwealth of Massachusetts, have invented a new and useful Improvement in Wire Brushes, of which the following is a specification, accompanied by drawings forming a part of the same, in which—

Figure 1 is a top view of a wire brush embodying my invention. Fig. 2 is a detached top view on a larger scale of a portion of my improved wire brush, with the ferrule shown in horizontal section. Fig. 3 is a detached side view of the same partly in vertical section, and Fig. 4 is a perspective view of the ferrule and a portion of the handle projecting through the ferrule.

Similar reference letters and figures refer to similar parts in the different views.

My invention relates to a wire brush designed for use in killing insects, comprising an improved construction of the contacting portion of the brush and method of attaching it to the handle, and it consists in the construction and arrangement of parts as hereinafter described and pointed out in the annexed claims.

Referring to the accompanying drawings 1 denotes the handle, preferably constructed of a single piece of wire, with a return bend 2, and the ends of the wire twisted together at 3. The ferrule 4, originally circular, is compressed slightly through a portion 5 of its length to receive the parallel ends 6 and 7 of the handle, as they emerge from the twisted portion 3. I have shown the end 6 with a right angled bend 13 to provide opportunity for the attachment to the handle of the wires 8 forming the contacting portion of the brush. Any other construction, however, having a transverse bend in one or both of the wires 6 and 7 would come within the scope of my invention. The circular ferrule 4 is also provided with an enlarged portion 9 to receive the bend 10 in the wires 8. The walls 11 of the enlarged portion 9 preferably taper slightly outward and are of sufficient length to inclose a portion of the wires 8 beyond the bend 10. When the wires forming the bend 10 are inserted in the circular portion 9 of the ferrule 4, it is flattened so that the bend 10 is pinched within the ferrule 4. The end 12 of the ferrule 4, slightly enlarged in diameter and arranged to contact with the wires 8 beyond the bend 10, will be compressed in the flattening process to a slightly greater degree than that portion of the ferrule 4 in contact with the bend 10, since the end 12 of enlarged diameter allows the wires 8 to spread slightly, beyond the bend 10. The bend 10 will therefore be retained in the ferrule not only by its contact with the walls 11 of the ferrule, but also by the restricted opening at the end 12, as shown in Fig. 3. The portion 5 of the ferrule 4 is then compressed to inclose separately the wires 6 and 7 of the handle, as shown in Fig. 3, whereby the ferrule is securely attached to the handle 1.

In the construction of the contacting portion of the wire brush, each of the wires 8 are given a continuous, preferably circular, bend which is then restricted at a desired point by compression or otherwise to form the bend 10 for insertion in the ferrule 4. As shown in the drawings, I preferably employ a single wire which is wound upon a spool or arbor to form the continuous bends of the wires 8 in the contacting portion of the brush, but any method by which a continuous bend throughout the length of the wires 8 is imparted to the wires 8 in the contacting portion of the brush would come within the scope of my invention. If a single wire is used, the contacting portion will be formed in a series of loops, as shown in Fig. 1. The flattening process to which the bend 10 is subjected in the ferrule 4, also brings the wires 8 to positions approximately in the same plane. In this way the curved strands of wire, comprising the contacting portion are caused to cross, assuming an extended position, in which they are held by the flattened ferrule 4.

By my improved method of imparting a continuous bend to the wires forming the contacting portion, I am enabled to maintain the desired position of all the strands in the brush without the use of ligatures or other flexible devices across the contacting portion of the brush which has heretofore been necessary. Also, as the strands of wire are permanently extended by the flattening process and assume irregular positions with relation to each other no further provision is necessary to provide for the passage of air through the brush when in use. In the wire brushes now in use, it is necessary to provide for this by the separation of the contacting portion of the brush into bunches or tufts and to secure them in such position.

In Fig. 4 I have shown an easy method of inserting the bend 10 in the ferrule 4 and also of additionally securing the bend 10 in the ferrule. The wire handle is moved longitudinally through the ferrule until the bend 13 in the wire 6 appears, to this bend 13 the wires 8 are preferably attached by a connecting wire 14 through the bend 10. The handle is then retracted and the bend 10 is brought within the ferrule 4.

By my construction in which a continuous bend is imparted to the wires of the contacting portion I not only provide a more efficient brush, but also a brush which will last longer and which can be more easily manufactured.

I claim,

1. A wire brush having a handle and a ferrule attached to said handle, a contacting portion formed from a single wire bent in a series of approximately circular loops in the same plane and of the same diameter, each loop inserted in said ferrule, and with all of said loops arranged to cross both at the entrance of said ferrule and at the outer portion of said loops.

2. A wire brush having a handle, a contacting portion composed of a series of curved wire loops, each loop extending from one side of the brush to the other in approximately the same plane and of the same diameter, and a single means for attaching all of said loops to said handle, with said loops arranged to cross each other just before said means of attachment and at the outer limit of said contacting portion, thereby holding each loop in said contacting portion in a separate position.

3. A wire brush having a handle, a contacting portion formed from a single wire bent in a series of wire loops, each loop in a continuous bend in the same plane and of approximately the same diameter extending from one side of said brush to the other, and a single means of attaching all of said loops to the handle, with said loops arranged to cross at the entrance to said means of attachment and at the outer limit of the bend of said loops, thereby held in a position to permit the passage of air between said loops.

4. In a wire brush, the combination with a handle formed from a single piece of wire having a return bend, with the ends of said wire twisted together and with one of said ends having a transverse bend, of a contacting portion and means for attaching said contacting portion to said transverse bend.

5. In a wire brush, the combination with a handle formed from a single piece of wire having a return bend at the outer limit of the handle, with the opposite ends of said wire handle parallel, a contacting portion for said brush separate from said wire handle, and a ferrule between said contacting portions and said wire handle, with one end of said ferrule arranged to receive said contacting portion and the other end separately inclosing each of said parallel wires of said handle.

FRANK MARTIN.

Witnesses:
LAWRENCE P. GREENMAN,
CLARENCE D. MIXTER.

Copies of this patent may be obtained for five cents each, by addressing the "Commissioner of Patents, Washington, D. C."